US007339949B2

(12) United States Patent
Suzuki et al.

(10) Patent No.: US 7,339,949 B2
(45) Date of Patent: Mar. 4, 2008

(54) ARQ TRANSMISSION AND RECEPTION METHODS AND APPARATUS

(75) Inventors: Hidetoshi Suzuki, Osaka (JP); Eiko Seidel, Langen (DE)

(73) Assignee: Matsushita Electric Industrial Co., Ltd., Osaka (JP)

( * ) Notice: Subject to any disclaimer, the term of this patent is extended or adjusted under 35 U.S.C. 154(b) by 1109 days.

(21) Appl. No.: 10/222,989

(22) Filed: Aug. 19, 2002

(65) Prior Publication Data

US 2004/0042492 A1 Mar. 4, 2004

(30) Foreign Application Priority Data

Aug. 22, 2001 (EP) ................................... 01120182

(51) Int. Cl.
  *H04J 3/16* (2006.01)
  *H04J 3/00* (2006.01)
(52) U.S. Cl. ...................................... 370/468; 370/498
(58) Field of Classification Search ...................... None
  See application file for complete search history.

(56) References Cited

U.S. PATENT DOCUMENTS

| 6,400,695 | B1 * | 6/2002 | Chuah et al. ................ 370/310 |
| 6,530,056 | B1 * | 3/2003 | Boxall et al. ................ 714/749 |
| 6,567,388 | B1 * | 5/2003 | Tomcik et al. ............... 370/335 |
| 6,868,079 | B1 * | 3/2005 | Hunt .......................... 370/345 |
| 6,956,855 | B1 * | 10/2005 | Chang ......................... 370/394 |
| 7,006,798 | B2 * | 2/2006 | Miyoshi et al. ........... 455/67.11 |
| 7,133,396 | B1 * | 11/2006 | Schmidl et al. ............. 370/347 |
| 7,149,192 | B2 * | 12/2006 | Kwak .......................... 370/320 |
| 2002/0071407 | A1 * | 6/2002 | Koo et al. ................... 370/335 |
| 2002/0075842 | A1 * | 6/2002 | Ghosh et al. ............... 370/347 |
| 2002/0114342 | A1 * | 8/2002 | Yao ............................. 370/429 |
| 2002/0122434 | A1 * | 9/2002 | Ido et al. ..................... 370/501 |
| 2002/0172208 | A1 * | 11/2002 | Malkamaki ................. 370/400 |
| 2003/0072266 | A1 * | 4/2003 | Uesugi et al. .............. 370/236 |
| 2004/0246925 | A1 * | 12/2004 | Wang .......................... 370/332 |

OTHER PUBLICATIONS

TIA/EIA/IS-707-A-2, Data Service Options for Spread Spectrum Systems, Mar. 2001; pp. 4-1 to 4-6.*

* cited by examiner

*Primary Examiner*—Kwang Bin Yao
*Assistant Examiner*—Warner Wong
(74) *Attorney, Agent, or Firm*—Stevens, Davis, Miller & Mosher, LLP.

(57) ABSTRACT

The invention provides an ARQ scheme where data packets are transmitted from the transmitter to the receiver in first predetermined time intervals, and positive (ACK) and negative (NAK) acknowledgement messages are transmitted from the receiver to the transmitter in second predetermined time intervals. For each data packet that has been transmitted from the transmitter to the receiver, at least two second time intervals can be used for transmitting the acknowledgement message. The invention therefore improves over synchronous feedback transmission schemes by adding flexibility without incorporating the drawback of asynchronous transmission schemes that are known to have a high signalling overhead. The invention is preferably applicable to UMTS and HSDPA systems but can also be applied in any other communications system. The feedback channel may be uplink or downlink.

20 Claims, 14 Drawing Sheets

ARQ TRANSMISSION AND RECEPTION METHODS AND APPARATUS

The invention relates to ARQ data transmission and reception techniques, and in particular to hybrid ARQ Type II and III schemes. The invention can be applied in mobile communications systems and is particularly applicable to cellular systems. In particular, the invention can be applied in the Universal Mobile Telecommunications System UMTS.

In common data communications systems, error detection of non-real time services is usually based on Automatic Repeat reQuest (ARQ) schemes which are combined with Forward Error Correction (FEC). The combination of ARQ and FEC techniques is often called hybrid ARQ (HARQ).

FEC introduces redundancy into a block of information bits of a given length to form a coded block of a different length, before transmission. The redundancy helps to combat errors at the receiver. If an error is detected by Cyclic Redundancy Check (CRC), the receiver requests the transmitter to send additional bits.

The most frequently used schemes in mobile communications are the stop-and-wait (SAW) and selective-repeat (SR) continuous ARQ techniques. A retransmission unit of the Radio Link Control (RLC) layer is referred to as protocol data unit PDU.

A transmitter arranged for being operated according to ARQ schemes is depicted in FIG. 1a. The input data which is to be transmitted is first buffered in buffer in 115. When there is data in the buffer 115 and the transmitter is assigned a physical channel for transmission, the data is encoded in the FEC encoder 120. The encoded data is then forwarded to the modulator 130 and the spreader 135 (in case of a Code Division Multiple Access CDMA system), shifted to the radio frequency (RF) by the RF circuit 140 and transmitted via the antenna 105.

Since the transmitter has to be able to receive requests from the receiver, the transmitter further comprises a duplexer 110 which allows for using one antenna 105 for transmission and reception purposes. When the transmitter receives a signal, it shifts the signal with the RF circuit 145 into the base band, despreads the signal in the despreader 150, forwards the despread signal to the demodulator 155, and extracts an ACK/NAK signal from the demodulated data. An ACK message informs the transmitter that the receiver was able to successfully decode the transmitted PDU. A NAK message informs the transmitter of a decoding error. Depending on whether the transmitter receives a positive (ACK) or a negative (NAK) acknowledgement message, the ACK/NAK extractor 160 accesses the code word buffer 125 for retransmission purposes, or will release the memory if an ACK has been received.

While in FIG. 1a a conventional transmitter has been shown, FIG. 1b illustrates a corresponding receiver. Most of the units of the receiver correspond to respective units of the transmitter and are therefore not described in more detail. These units are shown in the figure using the same reference numbers as in FIG. 1a. In addition to these circuits, the receiver includes a decoder 165 for decoding the demodulated data and outputting the decoding data. Depending on the ARQ scheme used the receiver might contain a code word buffer (not shown) between the demodulator 155 and the decoder 165 that can be used to combine retransmitted packets with previously received packets. Moreover, the receiver outputs a control signal to the ACK/NAK generator 170 for informing the generator that an ACK or a NAK message is to be generated. The generated message is then forwarded to the modulator 130 and the following units to be transmitted.

Turning now to FIG. 2, the process performed by the receiver will now be described in more detail with reference to the depicted flow chart. In step 210, the receiver receives a code word which is then stored in step 220. When code words have been previously transmitted, the received and stored code word may be combined with a previous code word of the same data unit, in step 230. It is then decided in step 240 whether the PDU can successfully be decoded. If so, a positive acknowledgement message is sent back to the transmitter and all the stored code words of that PDU are released (step 250). Otherwise, a negative acknowledgement message is sent (step 260) to request a retransmission.

Depending on the bits that are retransmitted, three different types of ARQ can be distinguished:

Type I: The erroneous PDU's are discarded and a new copy of the PDU is retransmitted and decoded separately. There is no combining of earlier and later versions of that PDU.

Type II: The erroneous PDU that needs to be retransmitted is not discarded, but is combined with some incremental redundancy bits provided by the transmitter for subsequent decoding. Retransmitted PDU's sometimes have higher coding rates and are combined at the receiver with the stored values. Thus, only little redundancy is added in each retransmission.

Type III: This ARQ type differs from Type-II ARQ only in that every retransmitted PDU is now self decodable. This implies that the PDU is decodable even without forming the combination with previous PDU's. This is useful if some PDU's are so heavily damaged that almost no information is reuseable.

The schemes II and III are more involved and show some performance gain because they have the ability to adjust the coding rate to changing radio environments and to reuse redundancy of previously transmitted PDU's. Such Type-II/III ARQ schemes are in the following referred to as "incremental redundancy". The separate versions of the PDU's are encoded differently in the physical layer to increase the coding gain for the combining process. These different portions of the overall code will be called code blocks or code words.

As the Type-II/III schemes include the combination of (re)transmissions, these techniques can be considered as a link adaptation technique since the redundancy can be adapted according to the channel conditions. Another technique that falls in the category of link adaptation, is adaptive modulation and coding (AMC). The principle of AMC is to change the modulation and coding format in accordance with variations in the channel conditions subject to system restrictions. The channel conditions can be estimated for instance based on feedback from the receiver. In a system that employs AMC, users in favourable positions are typically assigned a higher order modulation with higher code rates, e.g. 64 QAM with R=¾ Turbo Codes, while users in unfavourable positions are assigned a lower order modulation with lower code rates, e.g. QPSK with R=½ Turbo Codes. Favourable positions are for instance those close to the cell site, and unfavourable positions are those close to the cell boundary.

Throughout the following description, different combinations of coding and modulation will be referred to as Modulation Coding Scheme (MCS) levels. A transmission will be split into Transmission Time Intervals (TTI) where the MCS level could change each TTI. The main benefits of AMC are that higher data rates are available for users in favourable positions which in turn increases the average throughput of the cell, and that interference variation is reduced due to link adaptation based on variations in the modulation/coding scheme instead of variations in the transmission power.

For illustrating the transmission of ACK and/or NAK acknowledgement messages in the time domain, the ARQ timing relations will now be described in an example where a base station (Node B) transmits data to a mobile station called user equipment (UE) using a so called Shared Packet Channel where different users are time multiplexed. In UMTS such a channel is called Downlink Shared Channel (DSCH) whereas for HSDPA it is called High Speed Downlink Shared Channel (HSDSCH).

Over the feedback channel, the receiver can send information to the transmitter for notifying the transmitter whether the code block has been acknowledged or not. Usually, there is some delay involved until ACK/NAK messages can be sent because this information is often gathered in so called status reports. HARQ Type II/III schemes put severe requirement on the memory size to store this soft decision values for subsequent combining. Therefore, a very fast feedback channel is required with no involvement of higher layers as Radio Link Control.

As shown in FIG. 3, the base station transmits (Tx) a packet A to the mobile station UE1 on a physical channel. Due to the propagation delay $t_{prop}$, the data is received (Rx) at the receiver UE1 a certain time after it has been transmitted. The receiver will now demodulate and decode the packet, and will generate an ACK or NAK acknowledgement message. For demodulating and decoding the packet and generating the acknowledgement message, there will be a processing time of $t_{RXproc}$.

In the example of FIG. 3, packet A was not decodable so that the receiver has generated a NAK message 310. This NAK message is sent back to the transmitter, and again there will a propagation delay $t_{prop}$. The transmitter receives and extracts the NAK message and can then send the next code block with a minimum delay after a processing time $t_{TXproc}$. Thus, the number of code blocks that have to be stored are kept very small and overall delay is decreased.

Further, in the example of FIG. 3 the transmission from the base station to the mobile station (downlink transmission) is an asynchronous transmission whereas the uplink transmission, i.e. the feedback, is a synchronous transmission. This will now be explained in more detail.

In a protocol of synchronous transmissions, a data block is identified based on the time point the data block is received. Protocols for asynchronous transmission use an explicit signalling to identify a data block. For instance, a protocol of an asynchronous uplink transmission uses sequence numbers (SN) or other explicit identification of the feedback messages whereas synchronous uplink protocols identify the feedback messages based on the time when they are received.

As can be seen from FIG. 3, in the downlink direction the retransmission 330 of the UE2 packet A is scheduled one TTI after it has been negatively acknowledged 340. There has been another mobile station (UE) scheduled in between. In the uplink direction, the corresponding ACK/NAK's are sent after a predefined time period, in contrast to the downlink direction. For instance, for the first NAK 310 of packet A in FIG. 3, there is no signalling that identifies the relationship of this NAK to the packet A. This relationship can be derived since the NAK message is received a specified time after packet A has been transmitted 350, 360.

Thus, while the downlink transmission is asynchronous, there is a synchronous uplink transmission in the example of FIG. 3.

Using a synchronous transmission scheme in the feedback channel is disadvantageous for a number of reasons.

First of all synchronous transmission makes the system inflexible because transmission has to be done at predefined time instances. Particularly in the downlink, it would prevent, to some extent, the scheduling dependent on the channel state.

Further, with respect to the mobile station complexity, the buffer size for fast hybrid ARQ (HARQ) soft combining is of utmost importance. To reduce the buffer size, the Round Trip Delay (RTD) of the retransmissions has to be as small as possible. This will reduce the number of code blocks that must be stored. For synchronous transmission the timing of the uplink signal is predefined by the processing time $t_{RXproc}$. This time has to be standardised for all mobile stations, and has to have a value that corresponds to the maximum time until demodulation and decoding of the data is completed and the ACK/NAK message has been generated. Therefore, different implementations of mobile stations are not possible because low end UE's and high end UE's have to fulfill the same requirements. Another disadvantage is that ACK/NAK message generation cannot be accelerated in such systems by means of a special circuitry or new technologies since the processing time is standardised. There might also be other factors that could have an impact on the processing time and thus the ACK/NAK message uplink timing. For instance, the UE processing time $t_{RXproc}$ can vary from block to block, for instance because a varying number of Turbo Decoder iterations or Interference Canceller iterations are needed until the packet can be correctly decoded. Further, different values of $t_{RXproc}$ could apply due to different UE capabilities. Although giving some flexibility, this would increase the signalling overhead during call set-up. Particularly for packet traffic in a mobile environment this might not be the best solution since a call set-up might be required quite regularly. Thus, the number of different UE capabilities needs to be as small as possible.

While synchronous transmission in the feedback channel is disadvantageous for the above reasons, another drawback comes with adaptive modulation and coding (AMC). Depending on the channel conditions, different MCS levels will be selected, and the data rates will vary significantly between the MCS levels. The processing time strongly depends on the amount of received data and on the demodulation/decoding scheme that has to be applied. The value of $t_{RXproc}$ will thus depend on the selected MCS level and can only be optimised for the worst case, e.g. the highest MCS level, most iterations, lots of errors etc. For the other mentioned cases, the ACK/NAK timing will be insufficient, and the timing and thus the Round Trip Delay (RTD) will be fixed for all conditions. This might prevent the transmitter for scheduling retransmissions some TTI's earlier. The same problem of different UE processing times occurs when different physical resources, e.g. frequencies, codes, time slots, are allocated within different TTI's.

From the foregoing it should be apparent that a synchronous transmission scheme in the feedback channel is undesirable. However, using asynchronous timing in the feedback channel would also lead to severe disadvantages.

As mentioned above, asynchronous transmission requires a sequence number (SN) to be transmitted. The exact number of bits that is needed for signalling a sequence number, depends on the window size of the ARQ protocol. Because of these bits, asynchronous transmission can improve the throughput and delay performance and thus the flexibility of the system, but leads to a substantial signal overhead. The number of bits could be limited on the feedback channel which might prevent the use of good FEC encoding for multiple bits of a SN. Further, it increases the interference on the uplink and on other UE's feedback channels. Asynchronous transmission therefore increases the power consumption and requires a more complex user equipment. Thus, asynchronous timing cannot provide an adequate solution of the problems with the synchronous feedback channel.

Given the above problems, it is the object of the invention to provide a transmitter and a receiver, and corresponding methods, allowing for flexible timing of the ACK/NAK messages without signalling overhead.

This object is solved by the invention as claimed in the independent claims.

The transmission on the forward channel is split into time intervals. By using multiple predetermined time intervals in the feedback channel for transmitting the acknowledgement messages where the used time intervals of the feedback channel unambiguously correspond to the respective forward channel time intervals, the invention allows for operating different kinds of receivers having low as well as high processing times. A slowly processing receiver will then use a different time interval compared with a faster receiver. Moreover, since processing time not only depends on the receiver implementation, the used feedback time interval can be made dependent on the MSC level, reception quality, i.e. number of iterations of TC or IC, etc. Thus, flexibility is added to the system without the requirement of additional signalling.

The invention therefore provides an ARQ scheme with a fast feedback channel that combines the advantages of synchronous and asynchronous transmissions and that reduces the Round Trip Delay (RTD) times.

Preferred embodiments are defined in the dependent claims.

Further preferred embodiments of the present invention will now be described with reference to the figure drawings in which like reference numbers have been used for like elements. In the figures:

FIG. 4b is a flowchart illustrating the process of operating the transmitter of FIG. 4a;

FIG. 5b is a flowchart illustrating the process of operating the receiver of FIG. 5a;

Figure 9:
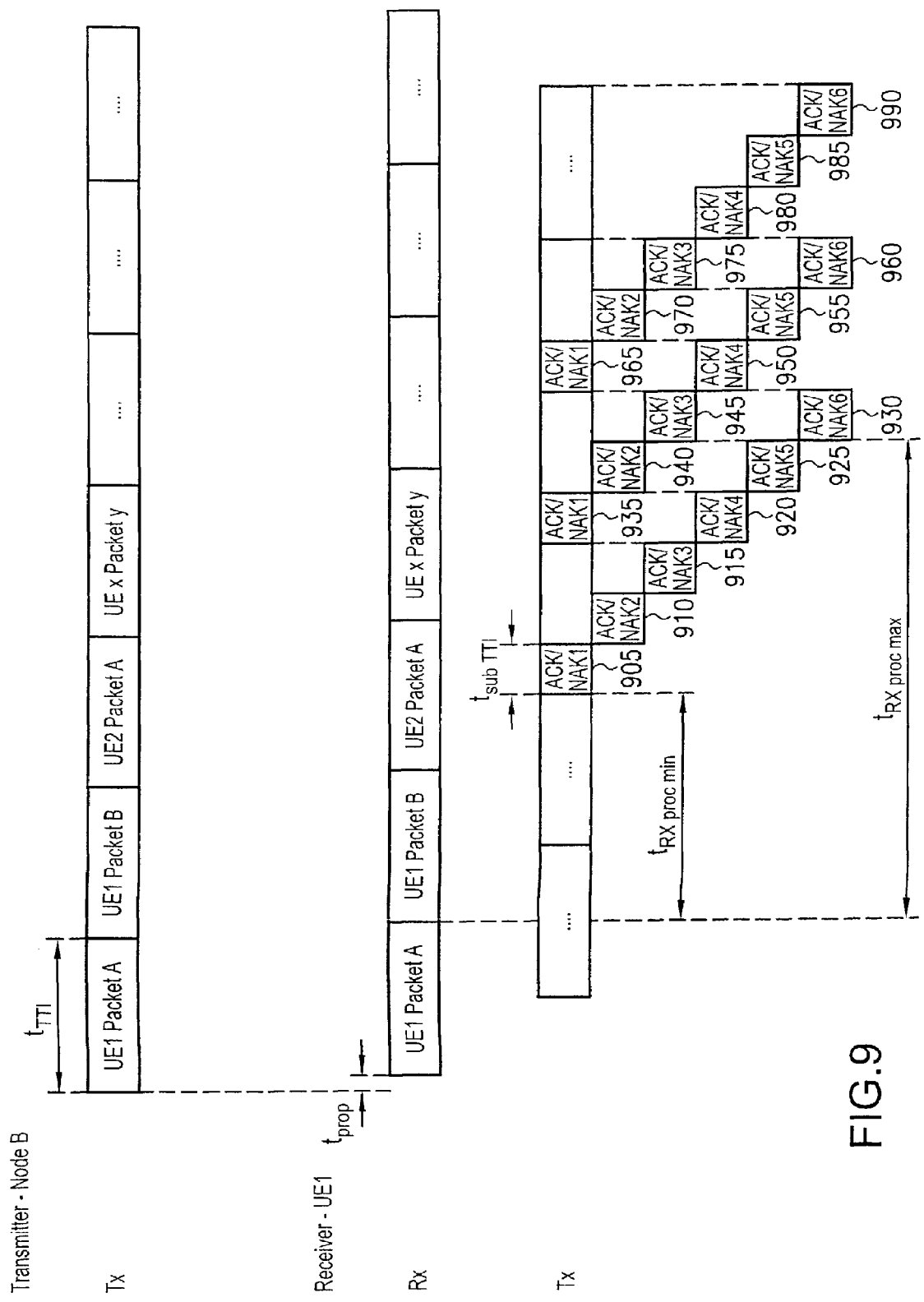
Figure 10:
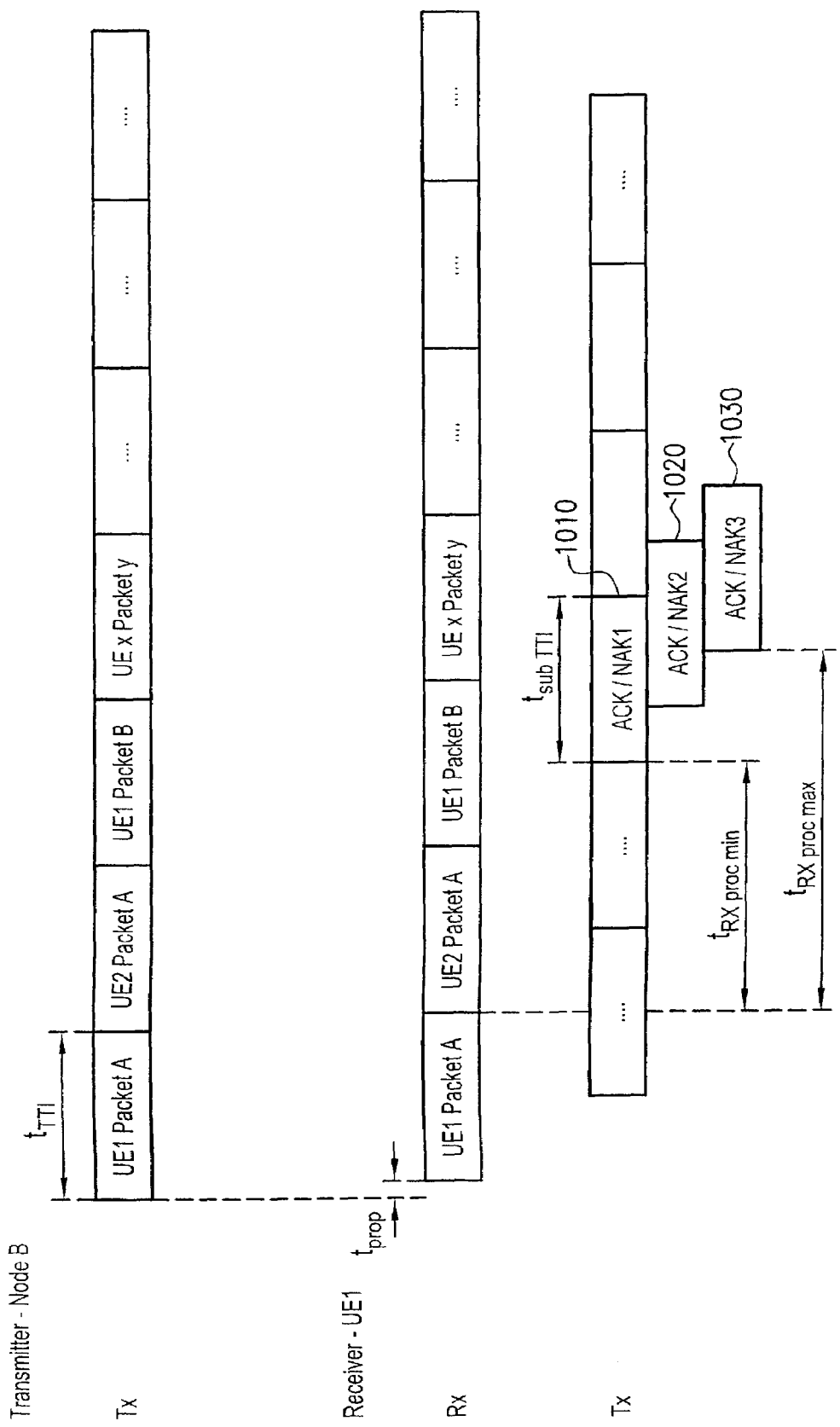
Figure 11:
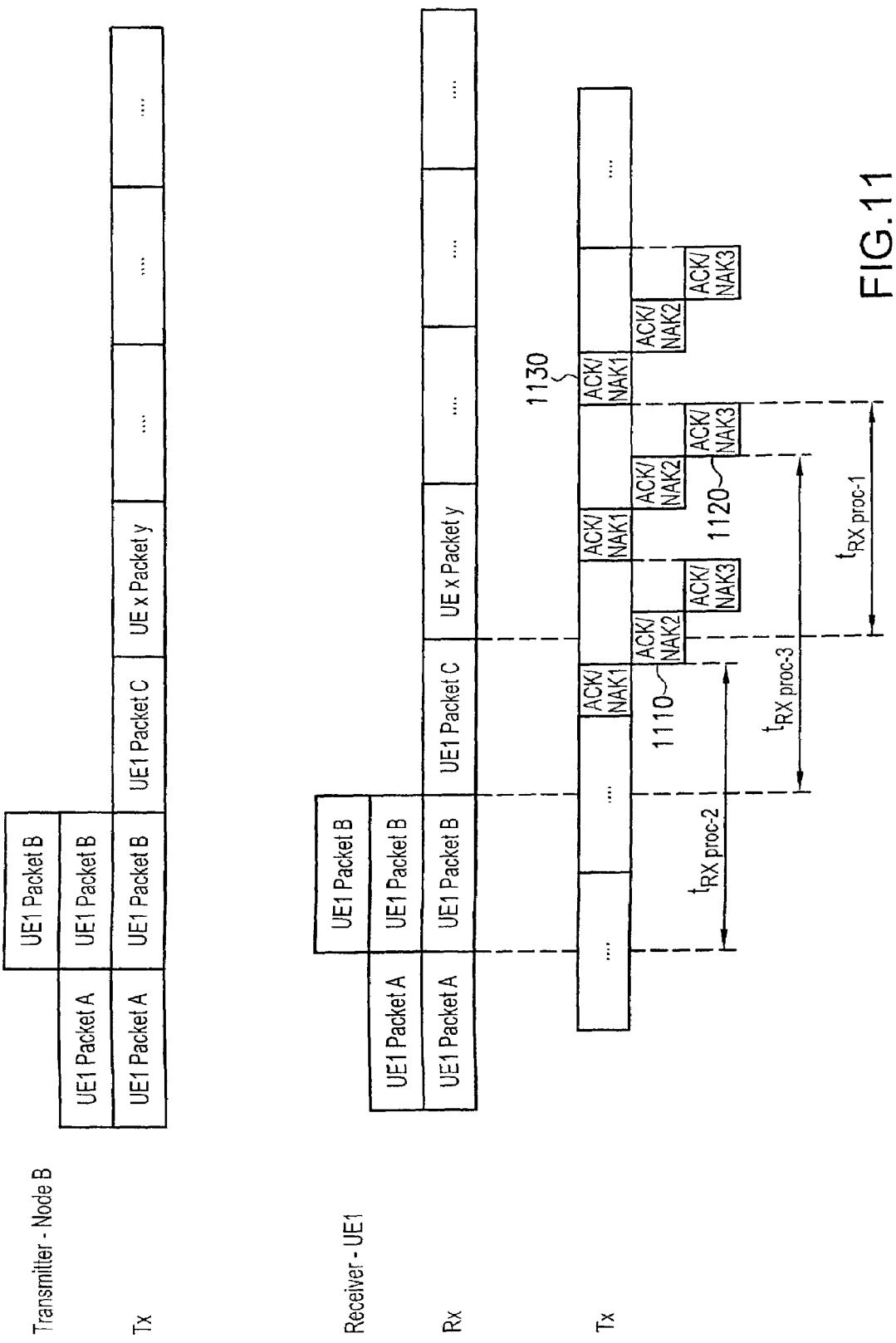
Figure 12:
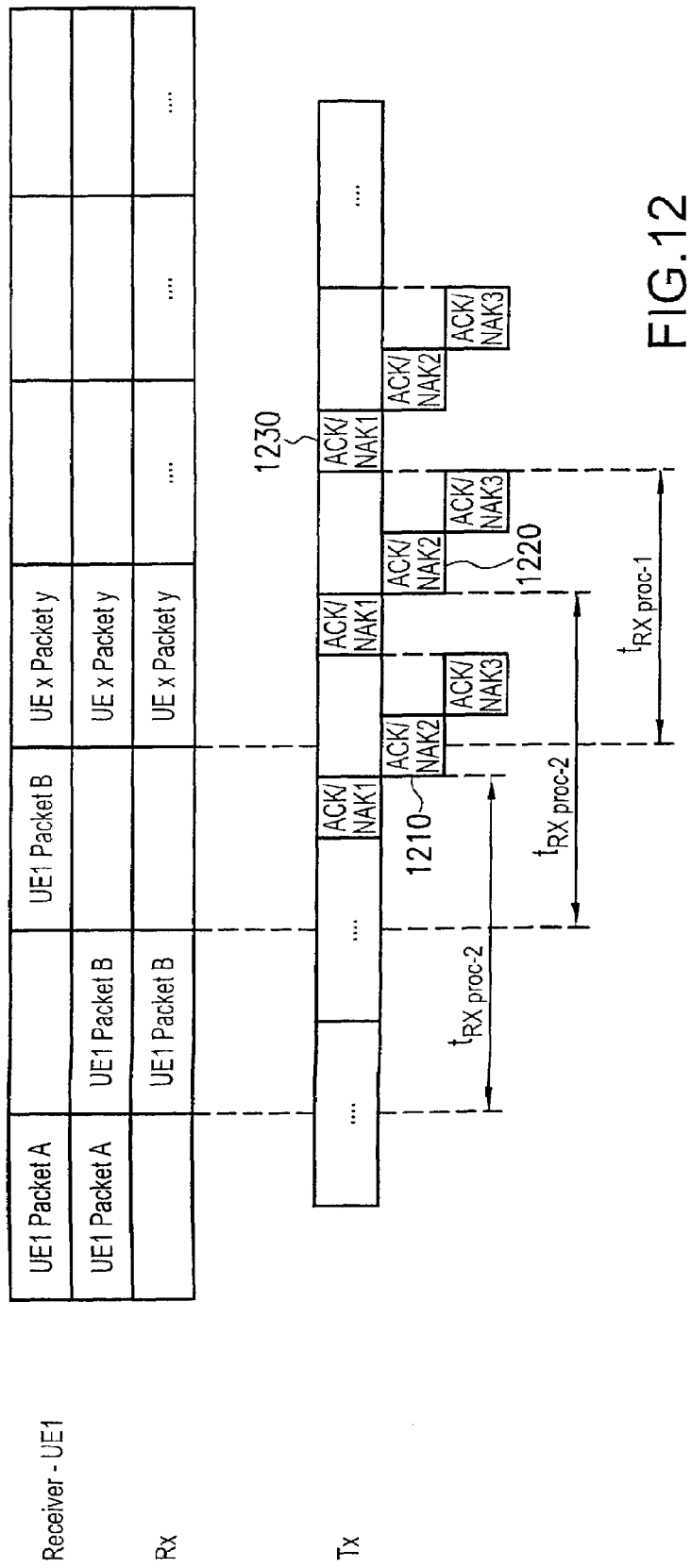
Figure 13:
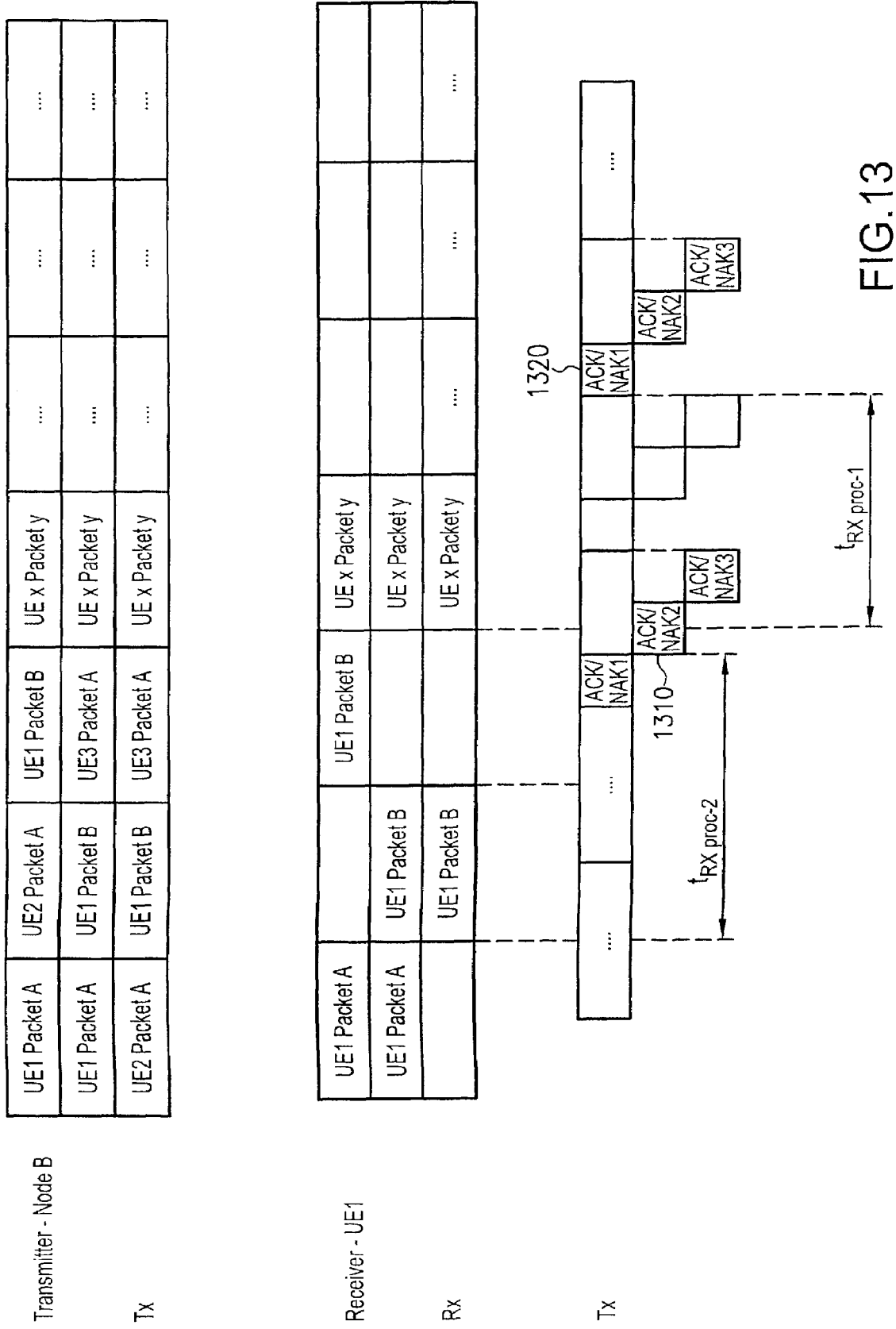
Figure 14:
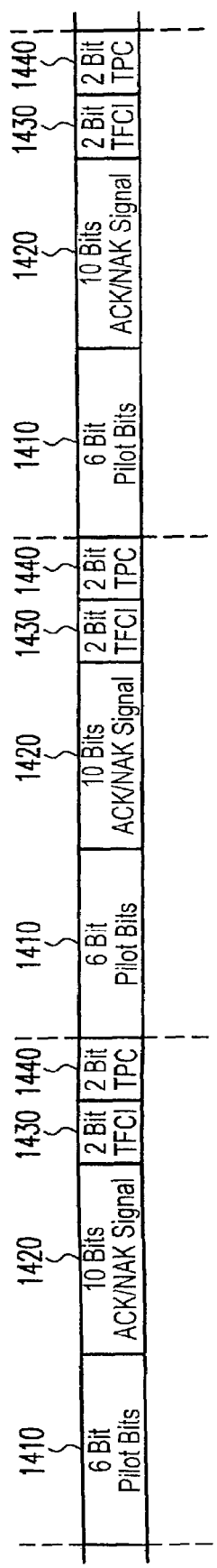

FIG. 9 is a further timing chart illustrating still another preferred embodiment of the present invention; and FIG. 10 is a further timing chart illustrating still another preferred embodiment of the present invention; and FIG. 11 is a further timing chart illustrating still another preferred embodiment of the present invention; and FIG. 12 is a further timing chart illustrating still another preferred embodiment of the present invention; and FIG. 13 is a further timing chart illustrating still another preferred embodiment of the present invention, and FIG. 14 illustrates an example of the mapping of the ACK/NAK signal to a Dedicated Physical Control Channel (DPCCH) slot structure.

Figure 1A:
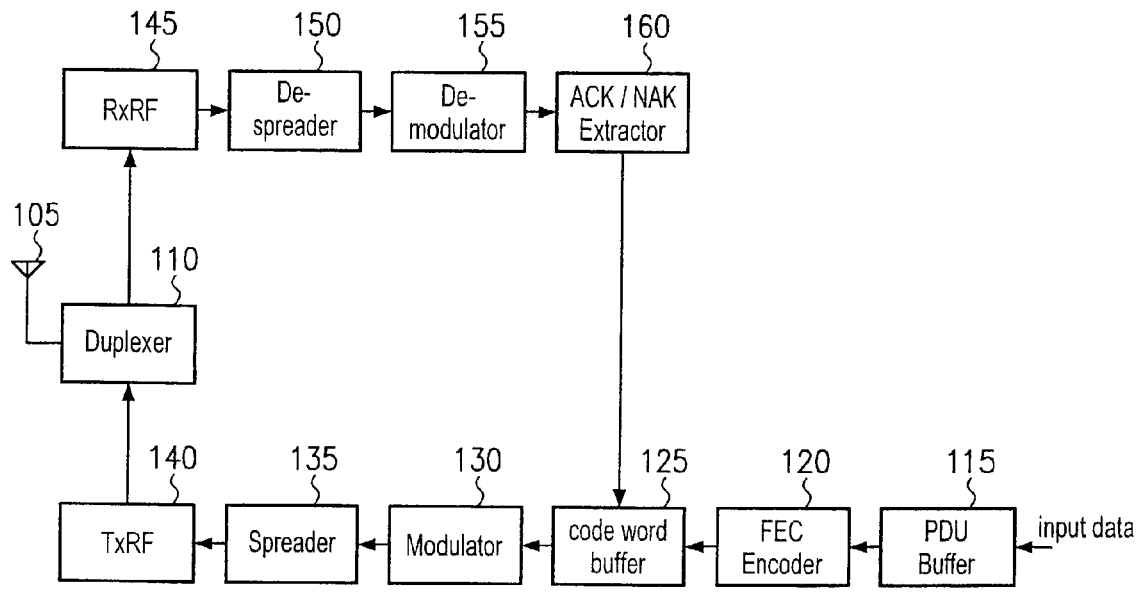
FIG. 1a illustrates a transmitter that can operate according to one of the ARQ schemes.
Figure 4A:
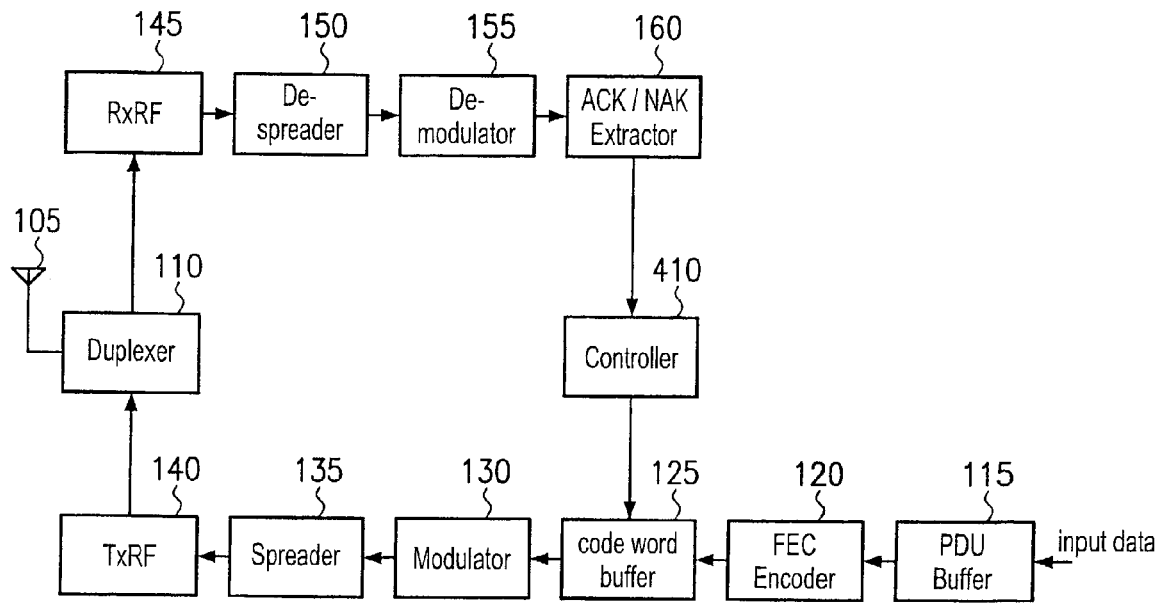
FIG. 4a illustrates a transmitter according to a preferred embodiment of the present invention.

Referring now to FIG. 4a, a transmitter according to a preferred embodiment of the invention includes most of the units that have already been discussed above with reference to FIG. 1a. In addition, the transmitter of FIG. 4a includes a controller 410 for monitoring the time intervals in which ACK/NAK messages have been received, and for controlling the retransmissions in response to the evaluation of the ACK/NAK signals. The details of how this control is done will be described herein below.

According to the invention, data packets are transmitted from the transmitter to the receiver in first predetermined time intervals. Acknowledgement messages are transmitted from the receiver to the transmitter on the feedback channel in second predetermined time intervals. In the following description, the first time intervals will be called transmission time intervals (TTI), and because the length of the second time intervals is preferably smaller than the length of the TTI's, the second time intervals are called sub-TTI's.

Figure 3:
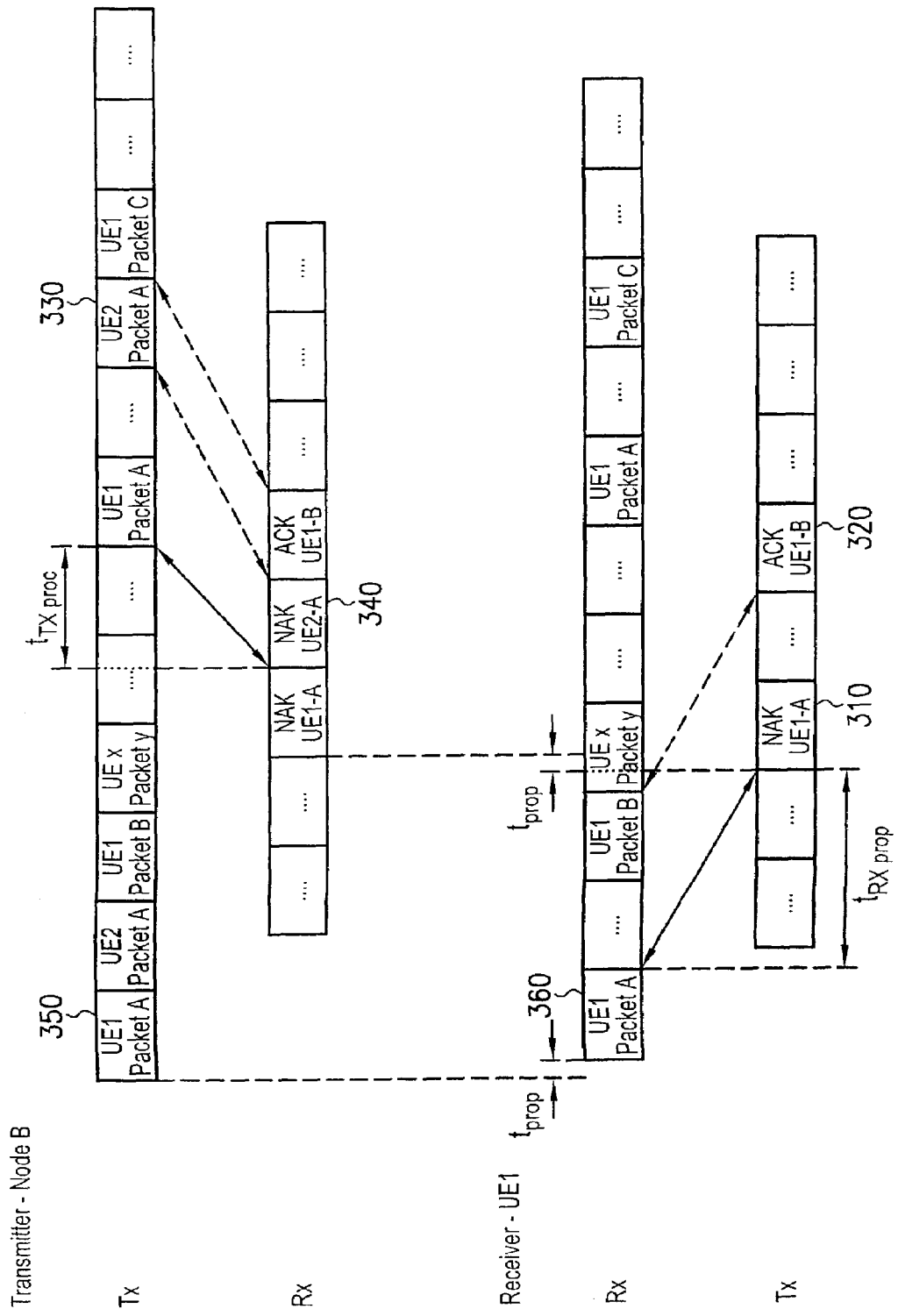
FIG. 3 is a timing chart showing the ARQ timing relations in a system where a synchronous feedback channel is used.

ACK/NAK messages could require some encoding such as Convolutional, Turbo, Reed Muller encoding and could be subject to interleaving before they are mapped on the channel structure. For systems such as Code Division Multiple Access (CDMA) it is preferred to spread the signal with a defined spreading factor to increase the spreading gain and to reduce the transmission power and the peak-to-average ratio. Unlike the transmission scheme depicted in FIG. 3, the preferred embodiment of the invention allows for an ACK/NAK signal to be transmitted at multiple time instances. In one embodiment of the invention this can be obtained by using smaller time intervals in the uplink, where the size $t_{TTI}$ of the TTI's in downlink direction is preferably an integer multiple of the length $t_{subTTI}$ of the sub-TTI's in uplink direction.

Figure 4B:
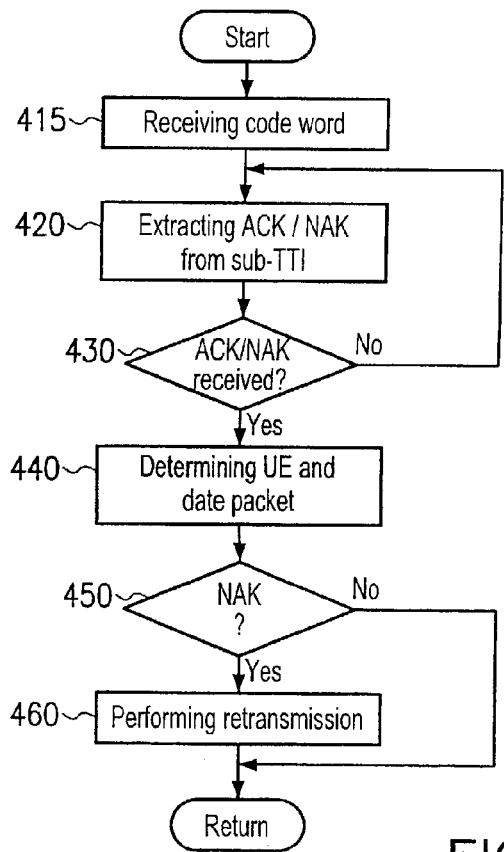

FIG. 4b illustrates an example of the process of operating the transmitter according to the invention. Data packets are repetitively transmitted to the receiver. Simultaneously, the transmitter receives on the feedback channel data in step 415 that might include ACK/NAK messages. Therefore, the transmitter analyses in steps 420 and 430 the received data of each sub-TTI for extracting the acknowledgement message from one of the predefined ACK/NAK time instances. Thereby, the controller 410 of the transmitter determines the sub-TTI that has been used for transmitting the acknowledgement message, and continues the process with step 440 as soon as the sub-TTI could be determined. Based on the determined sub-TTI, the controller 410 can now determine from which mobile station the ACK/NAK signal has been received and to which data packet this signal is related (step 440). Then, the controller 410 determines in step 450 whether a positive or negative acknowledgement message has been received, and if the respective data packet could not be decoded by the respective mobile station, i.e. if a NAK message is received, a retransmission is performed in step 460 in compliance with the ARQ scheme requirement.

The corresponding construction of a receiver according to a preferred embodiment of the invention is shown in FIG.

Figure 1B:
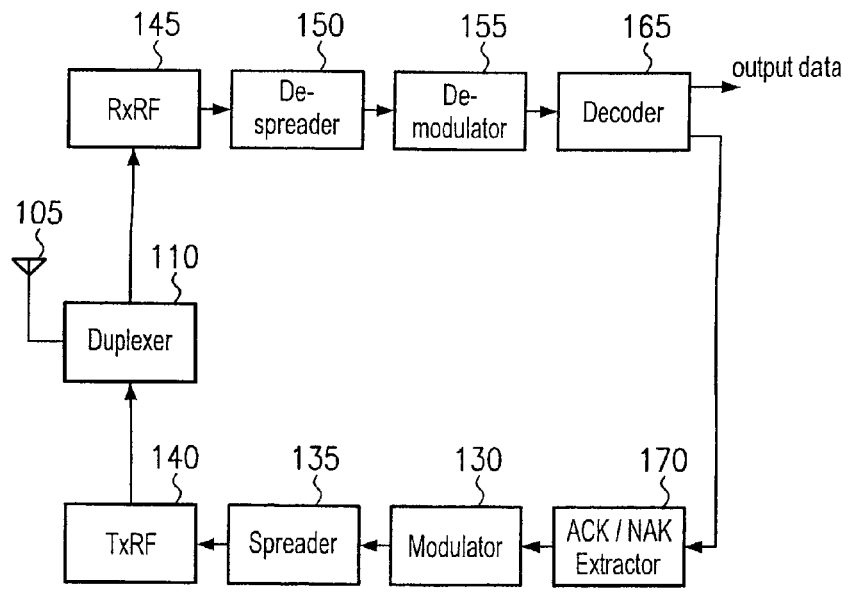
FIG. 1b illustrates a receiver that can operate according to one of the ARQ schemes.

5a. Again, most of the units that have already been discussed above with reference to FIG. 1b need not be explained here. In addition, the receiver of FIG. 5a includes a time interval selector 510 that receives the control signal from the decoder 165 and is used for selecting the earliest possible sub-TTI for transmitting the acknowledgement message.

Figure 2:
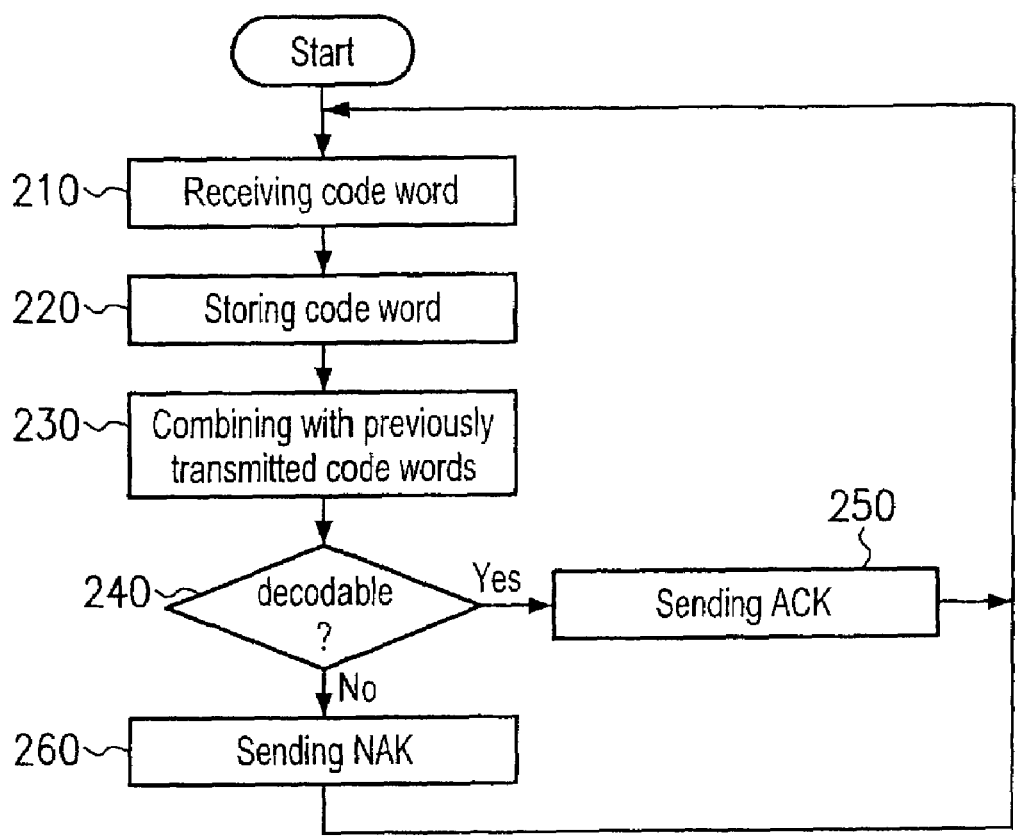
FIG. 2 is a flowchart illustrating the process of a receiver that can operate according to one of the ARQ schemes.
Figure 5A:
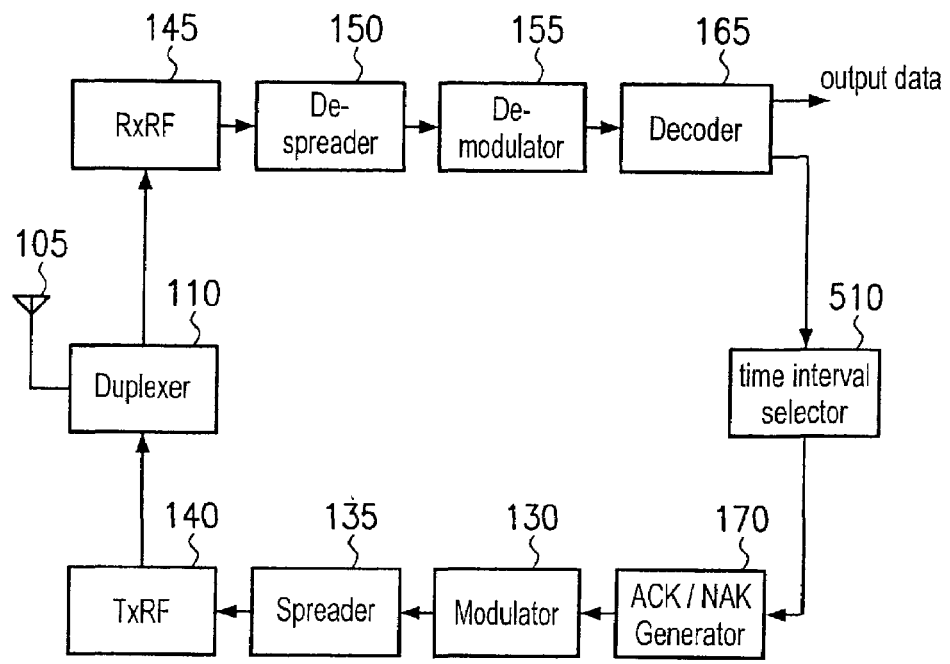
FIG. 5a illustrates a receiver according to a preferred embodiment of the present invention.
Figure 5B:
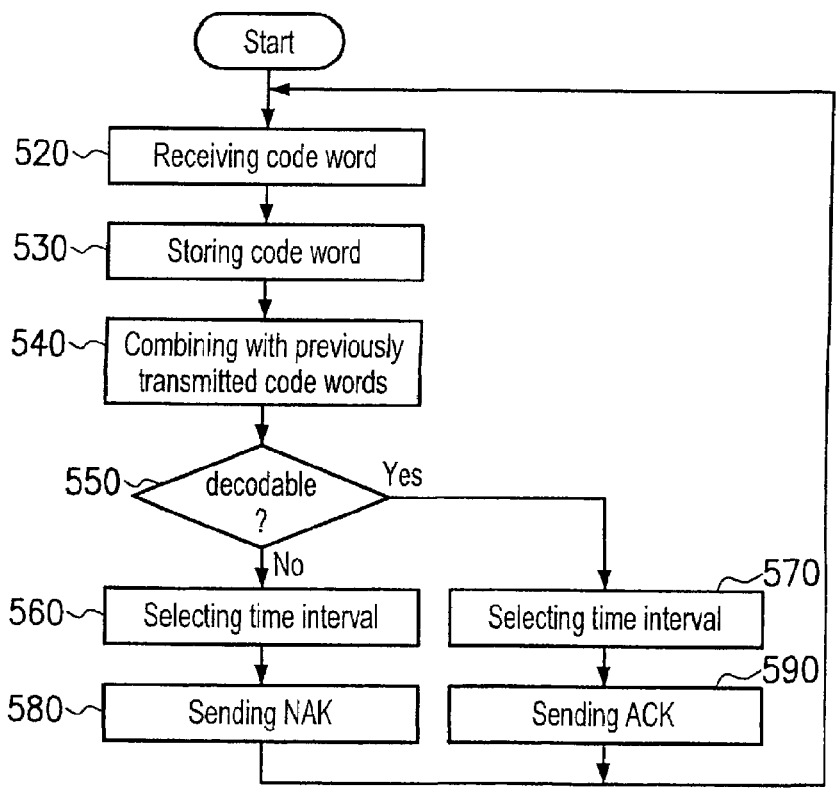

The operation of the receiver of FIG. 5a can be seen from the flow chart of FIG. 5b. The process of FIG. 5b differs from the conventional process of FIG. 2 by the additional steps 560, 570 of selecting the next possible time interval (sub-TTI) before transmitting the ACK/NAK message.

Figure 6:
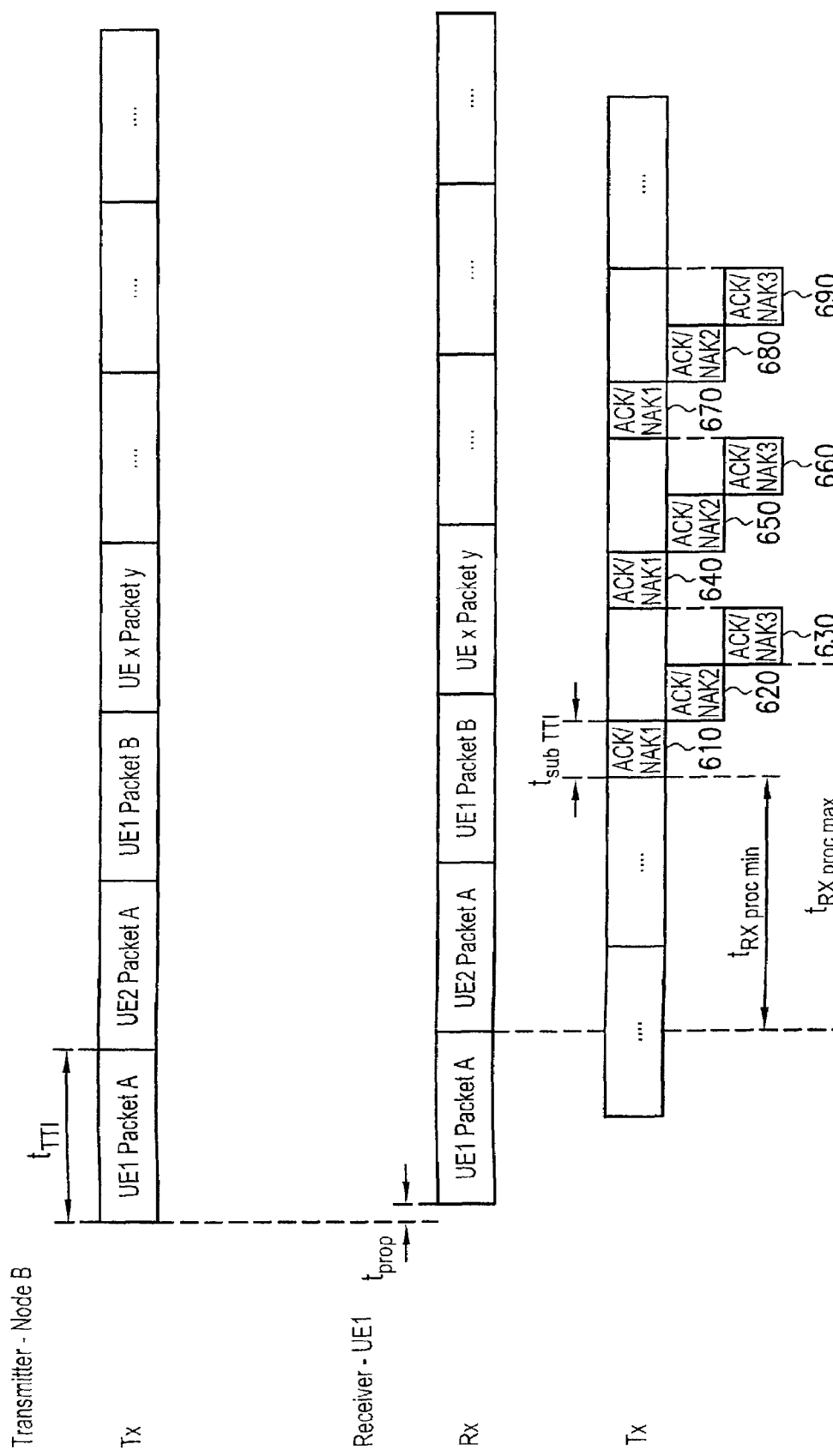
FIG. 6 is a timing chart illustrating how the invention can be performed according to a first preferred embodiment.

Turning now to FIG. 6 which depicts a timing chart of how to operate a communications system according to a preferred embodiment of the invention, it can be seen that the TTI used in the downlink direction is split into three sub-TTI's (the fields marked by dots relate to different users and are shown for illustrative purposes only). Thus, in the present embodiment three different time instances 610, 620, 630, or 640, 650, 660, or 670, 680, 690, respectively, are allowed for transmitting the ACK/NAK signal uplink. The transmitter is required to monitor the signal at least at these possible time instances using the controller 410. A mobile station that can process received encoded data at high speed will therefore be allowed to send an ACK/NAK message back to the transmitter immediately after the processing result is obtained. User equipment that operates more slowly would not be in the position to transmit the ACK/NAK message in the first possible sub-TTI 610, 640, 670 because it requires a higher processing time $t_{RXproc}$. The same situation occurs for AMC when a high MCS level has been sent. The user equipment might not be able to process the largest amount of data in the first possible sub-TTI 610, 640, 670. Thus, slowly operating receivers are allowed to use a different sub-TTI, e.g. 620 or 630, without slowing down other mobile stations. Further, a faster ACK/NAK is made possible for other TTI's.

In the embodiment of FIG. 6, the ACK/NAK sub-TTI's of different TTI's do not overlap. Thus, whenever the transmitter receives an ACK/NAK signal from the receiver, it can determine by means of the sub-TTI that is used, which data packet is associated with the respective ACK/NAK message. Therefore, an unambiguous correspondence is maintained and a flexible ACK/NAK timing is obtained within a TTI. Of course, the transmitter needs to know that the receiver is allowed to use, in the present example, three different sub-TTI's for transmitting the ACK/NAK signal.

Figure 7:
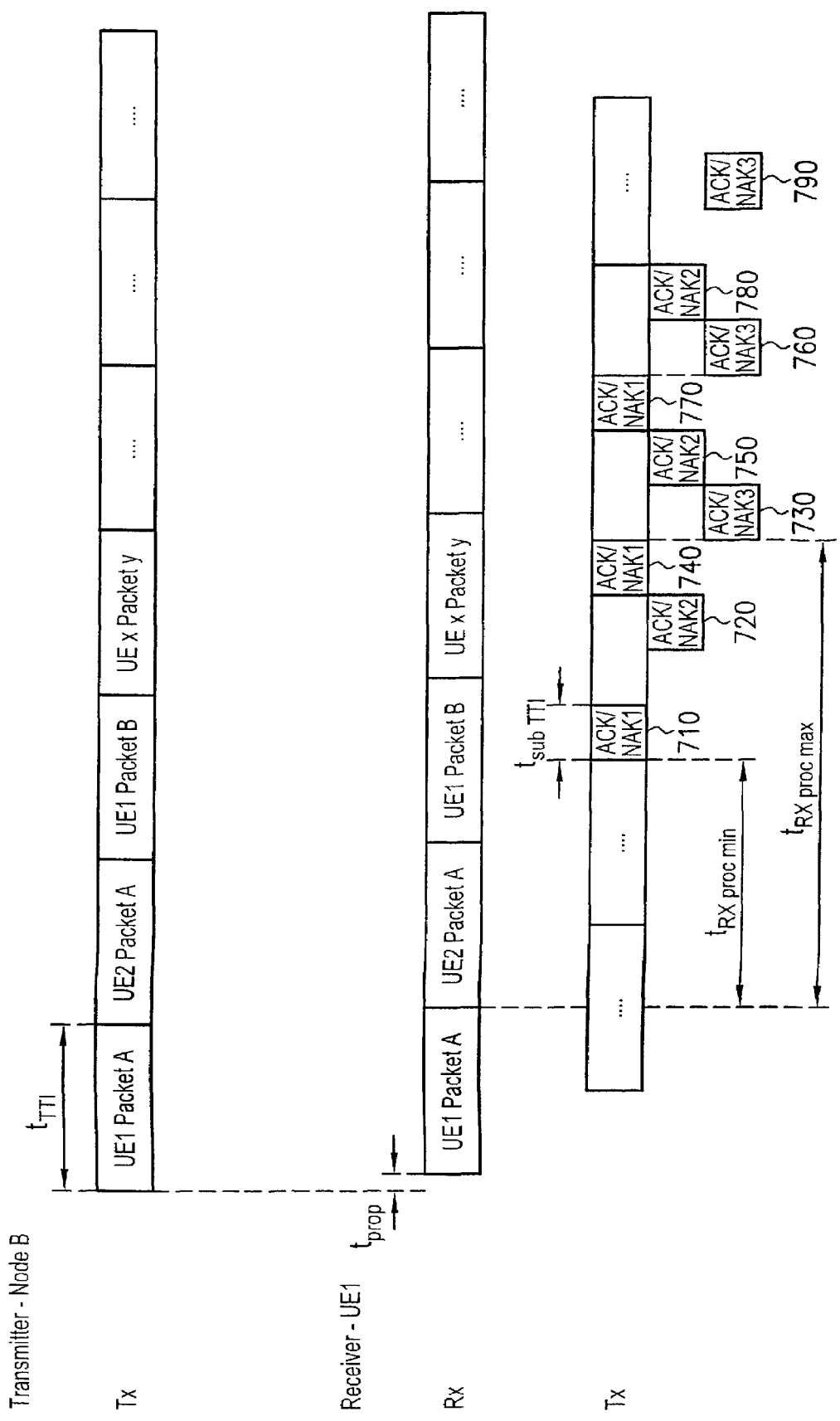
FIG. 7 is a timing chart according to another preferred embodiment of the present invention.

A further preferred embodiment is depicted in FIG. 7. In this embodiment, a different predefined mapping of sub-TTI's to the frame structure is used. Compared with the embodiment of FIG. 6, the time difference between the minimum and maximum processing times $t_{RXproc\ min}$ and $t_{RXproc\ max}$ is increased to an amount that is greater than the length of one TTI:

$$t_{RXproc\ max} - t_{RXproc\ min} > t_{TTI}.$$

This can lead to the order of ACK/NAK messages from different packets or mobile stations being changed according to the processing times. The transmitter could for instance receive the ACK/NAK message of packet A from user equipment UE2 before the ACK/NAK message of packet A from user equipment UE1. Further, the ACK/NAK message 740 of packet B can be received from user equipment UE1 before the ACK/NAK message 730 of packet A of the same user equipment. This could for instance occur for a single user where the MCS level is switched from higher order modulation, e.g. 16 QAM, to a lower MCS level, e.g. QPSK, or from many allocated resources to the smallest allocation.

There might also be data of higher priority requiring faster decoding. The unique correspondence of sub-TTI's to a packet and to the user equipment is still maintained, and any interference of ACK/NAK signals of different mobile stations is avoided. Moreover, the ACK/NAK messages of a single user equipment are not transmitted at the same time. For CDMA, this means that multi-code transmission (specific code per ACK/NAK signal) is avoided which would result in a higher user equipment complexity.

Figure 8:
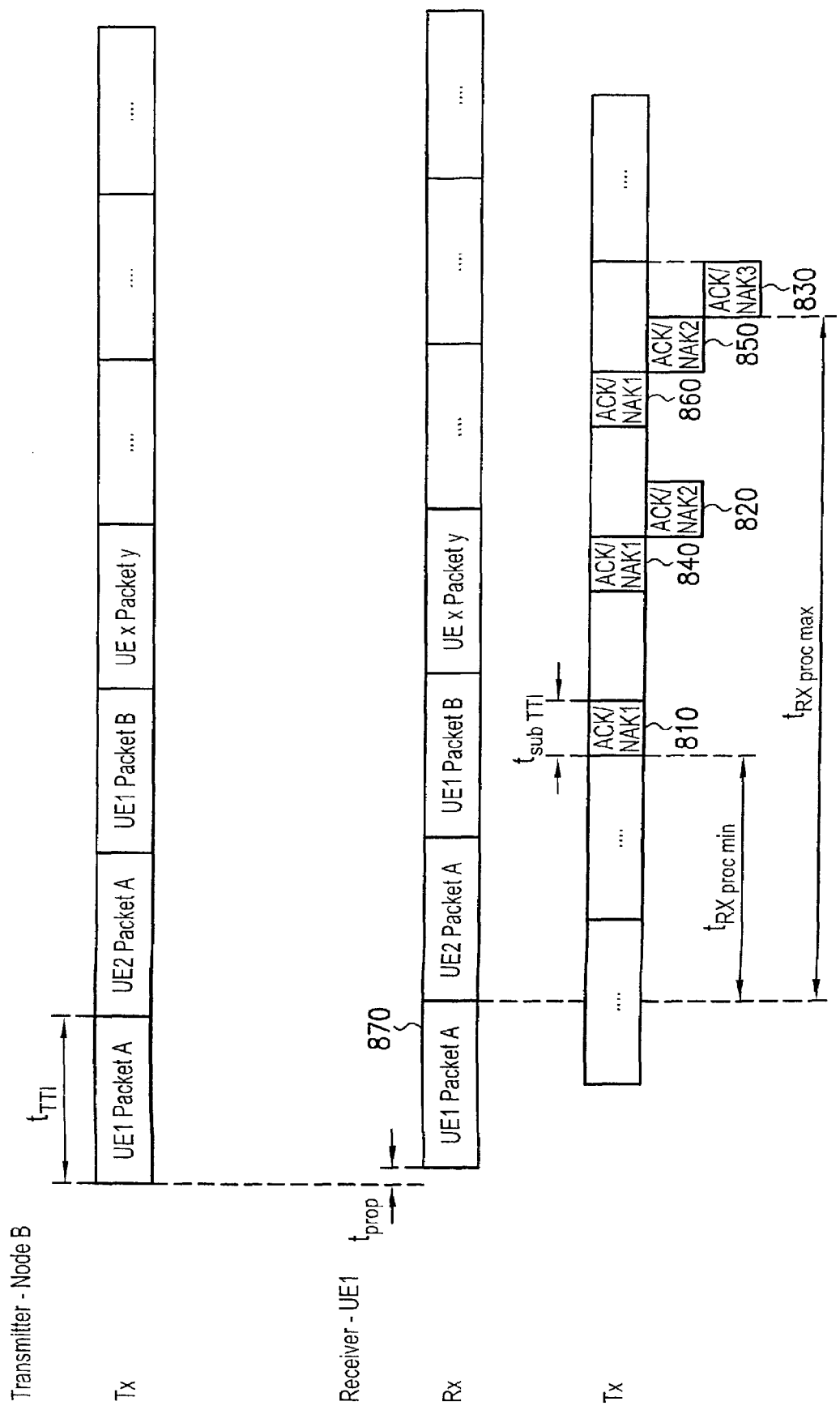
FIG. 8 is a timing chart illustrating yet another preferred embodiment of the present invention.

While in the embodiment of FIG. 7, the difference of the minimum and maximum processing times $t_{RXproc}$ has been increased so that the first and the last possible sub-TTI for each packet are positioned in neighbouring TTI's, this difference can still be increased. This is depicted in FIG. 8 where the sub-TTI's 810, 820, 830 that relate to one packet 870 are still more separated. This, once again, increases the flexibility without affecting the unambiguity of the packet correlation.

Turning now to FIG. 9, another preferred embodiment will now be described that adds again more flexibility to the system. As can be seen from FIG. 9, multiple ACK/NAK signals from different packets or mobile stations are allowed to be transmitted at the same time, for instance sub-TTI's 920 and 935, 925 and 940, 930 and 945, 950 and 965 and so on. For instance, in contrast to the examples shown in FIGS. 6 to 8, user equipment UE1 receives packet B directly after packet A. In the embodiment of FIG. 9, there are six possible ACK/NAK signal positions that overlap with each other. There are two different ACK/NAK signals defined which alternate by modulus 2. The ACK/NAK signals could be obtained by using certain signatures or in CDMA by using different channelisation codes. The channelisation codes of a single user equipment could be selected to be orthogonal to each other. In that case, the channelisation codes would not interfere with each other if the ACK/NAK signals are from a single user equipment. If there is some scheduling or co-ordination of ACK/NAK transmissions, a multi-code transmission could be avoided. This would exclude that the ACK/NAK signals of both packets are sent at the same time.

While in the previous embodiments, the sub-TTI size has been shown to be smaller than the TTI size it is within the invention that the size of the sub-TTI intervals is equal or even greater than the size of the TTI's. A preferred embodiment that uses equal sized sub-TTI's is shown in FIG. 10. In this example there are three time intervals 1010, 1020, 1030 available for transmitting an acknowledgment message, and this is made possible by overlapping the intervals. The overlap of the ACK/NAK signals with ACK/NAK signals of other TTI's makes it necessary to define different ACK/NAK signals as described before.

Further embodiments of the invention are based on the development of new generation mobile communications systems that will be very flexible and will allow the support of all kind of services. Furthermore they will be adaptable to the radio channel, thereby increasing the user and system throughput. Thus, there might be several dimensions in which a system is flexible. When only looking at the scheduling of the user data the transmission needs to be very sophisticated. The smallest data unit to be scheduled in downlink, that can be considered so far, was a downlink TTI. Depending on the mobile channel, different MCS levels will be selected making the system flexible in the modulation scheme and the coding that is used within this TTI. A TTI that is basically time-multiplexing of users that could have different intervals. For different access technologies such a time interval of a physical channel (called Shared Packet Channel) corresponds to different physical resources (e.g. to a number of codes in CDMA or a number of frequencies in FDMA). Depending on the design criteria's there could be flexible allocation of TTI sizes, codes, frequencies and others during a transmission. The invention is therefore applicable to different system design approaches.

A preferred embodiment of the invention is therefore to have a variable size TTI for uplink and downlink directions, and a different number of ACK/NAK sub-TTI's are defined depending on the respective TTI sizes. The TTI size $t_{TTI}$ could be configurable parameter of the transmitter that needs to be signalled to the receiver. It would for instance be possible to vary the TTI length for downlink transmission between three slots as described previously and one slot. If in downlink direction one slot is used, for each TTI in downlink direction (i.e. for each time slot) an ACK/NAK sub-TTI of one time slot would be used in uplink direction, similar to the scheme depicted in FIG. 3. To obtain a flexible timing in such a case where the uplink sub-TTI is the same as the downlink TTI, different ACK/NAK signals need to be defined. It can happen that multiple ACK/NAK messages are received at the same time that need to be distinguished. There is the possibility that the downlink transmission is reconfigured from a TTI of one time slot to a TTI of three time slots while keeping the uplink sub-TTI of the ACK/NAK signal at one time slot. In doing so, the possibility of a flexible timing (three time instances) of the feedback channel is obtained such as depicted in FIG. 6, while keeping exactly the same uplink slot structure. Such uniform uplink slot structure will reduce the implementation complexity.

A further embodiment of the invention employs variable physical resources per TTI. The schemes as described so far allocated all the resources to a single user within a TTI (users are time multiplexed on that channel). Although preferable from implementation point of view such a scheme might be not optimum in several cases. First of all the granularity might not be small enough that a small data packet can fill up all resources. The same problem occurs at the end of larger data packets, where the remaining part of a packet data unit does not fit into the TTI. There are different options to proceed, either some physical resources, e.g. codes, frequencies, time, are left unused or they are filled with dummy bits. Another option would be to increase the reliability by increasing forward error correction (FEC) or reducing the transmission to a lower modulation scheme.

All these methods are not optimum in terms of resource usage or in terms of adaptation to the mobile channel state. A straight forward solution would be to reduce the physical resources per TTI. In FIG. 11 the use of the invention in relation to this scenario can be seen. In this embodiment, the physical resources are split into three portions each allocated to one or more codes (assuming CDMA). Depending on the number of codes the user equipment processing time can vary: from $t_{RXproc-1}$ in case of one code portion, to $t_{RXproc-3}$ in case of three code portions. In this example it varies by a slot. The method described allows the number of resources allocated within a transmission time interval could also be changed without the need to change the ACK/NAK timing allocation.

As seen in FIG. 11 only a portion of the resources is used per TTI: ⅔ of the resources for Packet A and only ⅓ resources of Packet C. An option to improve the scheduling is to use successive code block assignment as illustrated in FIGS. 12 and 13. In these embodiments the scheduler is allowed to schedule a packet over TTI's, which simplifies and improves the operation of the scheduler. In a way this can also be seen as variable TTI transmission. UE1 Packet B is split over the second and the third TTI.

Two embodiments for a feedback channel are shown in the figures, depending on whether the option "ACK/NAK per TTI" is chosen or the option "ACK/NAK per code block". In FIG. 12 each TTI will be acknowledged, whereas in FIG. 13 each packet will be acknowledged. Both described embodiments gain from a flexible timing. The acknowledgment of the third TTI in FIG. 12 or the data block UE1 Packet B in FIG. 13 can already be transmitted at the minimum UE processing time 1230, 1320 (i.e. ACK/NAK1 instead of ACK/NAK3). This is similar case as for AMC where a TTI will correspond to a large amount of data or a small amount of data depending on the MCS level (chosen according the channel conditions).

As apparent from the foregoing description, the invention combines the advantageous of synchronous and asynchronous transmission. While there is still a strict timing of the ACK/NAK signals there will be multiple time instances defined at which the ACK/NAK signal can be received. There is no additional signalling involved in this method if the ACK/NAK time instances that are to be used for different processing times $t_{RXproc}$, are predefined. Different ACK/NAK timings can be obtained without the exchange of user equipment capability signalling. Depending on the user equipment implementation and the actual decoding/demodulation process, the ACK/NAK signal can thus be sent at different time instances. By a unique allocation of the ACK/NAK signals, the unambiguous correlation to the correct TTI of the packet channel is maintained. There is also flexibility introduced for the user equipment implementation. The manufacturer is for instance allowed to produce low complexity user equipments with long processing times and some limited performance while there is still the option for high end terminals and future improvement. The number of resources allocated within a TTI could also be changed without the need to change the ACK/NAK timing allocation. In the invention, there is no signalling of the sequence number (SN) of the code block required. Since there is only the need for one bit to signal ACK or NAK this bit can be encoded more reliable than the sequence number which is important for the rebustness of the ARQ protocol. The size of the ACK/NAK signal is therefore reduced and the time for decoding the ACK/NAK signal is minimised, allowing for faster retransmissions.

It will therefore be appreciated, that the invention provides a retransmission technique where the ACK/NAK timing can be done in a flexible manner with reduced signalling overhead. The scheme according to the invention can be considered as being a synchronous uplink transmission where flexibility is added by opening the possibility of sending ACK/NAK signals in various sub-TTI's. It is possible to map the ACK/NAK signal, e.g. one bit before encoding, to a smaller sub-TTI while still ensuring reliable reception and acceptable transmission power. Since the ACK/NAK signal is not spread over the entire TTI, the processing time until the ACK/NAK signal can be decoded is reduced. Furthermore, the invention allows for transmitting the ACK/NAK signal at any sub-TTI or at only some of them. The sub-TTI's are predefined to allow the unambiguous reception of acknowledgement messages for each packet. The invention further allows the ACK/NAK time instances to be scaled according to the requirements. Moreover, by treating the ACK/NAK signals differently from the data that is mapped on a logical data or control channel, the lowest Round Trip Delay (RTD) is ensured.

The invention is preferably applied to CDMA and UMTS systems. Moreover, the invention is particularly applicable to High Speed Downlink Packet Access (HSDPA) which is a work item for UMTS that is currently under investigation at 3GPP Standardisation. HSDPA will allow higher data rates in the downlink direction, using the High Speed Downlink Shared Channel (HS-DSCH) for transmitting the data packets downlink.

According to a further preferred embodiment, and as already described above, acknowledgement messages relating to different data packets may be distinguished based on channelisation codes or signatures. For that purpose, the transmitter might perform an additional step (not shown in FIG. 4b) between steps 420 and 430 for evaluating the codes/signatures. On the other hand, the receiver might perform an additional step (not shown in FIG. 5b) between steps 560 and 580, and between steps 570 and 590, for selecting the codes/signatures.

A preferred example that can be used for downlink data transmission is to use three time slots as TTI while in the uplink direction for transmitting the ACK/NAK signals only one single time slot is used. FIG. 14 illustrates how such sub-TTI's can be mapped on a physical channel. In the illustrated example, it is assumed that the ACK/NAK signal is mapped to a Dedicated Physical Control Channel (DPCCH) as specified for UMTS. In the uplink direction, the DPCCH is in parallel to the Dedicated Physical Data Channel (DPDCH). In this case, the spreading factor is decreased from 256 to 128 which increases the number of available bits from 10 to 20. Assuming that the ACK/NAK signal is mapped to 1 bit before encoding, the encoding of the ACK/NAK bit might result in 10 encoded bits 1420. Further, there are 6 pilot bits 1410 for coherent detection, 2 Transport Format Combination Indicators (TFCI) bits 1430 for identifying the uplink transport format and 2 Transmit Power Control (TPC) bits 1440. There are several other possibilities to map the ACK/NAK signal to the physical channel, and it should be apparent to those of ordinary skill in the art that any of these other possibilities are within the invention, including e.g. code multiplex to DPCCH or DPDCH, time multiplex to DPDCH, new physical channel etc.

While the invention has been described above with reference to the figure drawings in which the feedback channel has been shown as being in the uplink direction, it will be appreciated by those of ordinary skill in the art that the invention is not limited to uplink feedback channels. Rather the invention can also be employed in communications systems where the ARQ feedback channel is downlink.

The invention claimed is:

1. An Automatic Repeat Request (ARQ) transmitter for transmitting data on a radio channel in a communications system to a receiver, the transmitter comprising:
    a transmission unit for encoding the data and transmitting an encoded data packet;
    a receiving unit for receiving a positive or negative acknowledgment message from the receiver indicating that the receiver was or was not able to decode the data packet; and
    a retransmission section for operating the transmission unit to perform a retransmission if a negative acknowledgment message was received;
    wherein the transmitter transmits data packets in first predetermined time intervals and receives acknowledgment messages in second predetermined time intervals after the first time intervals; and
    a control section for monitoring at least two second time intervals for possible reception of one acknowledgment message in response to each transmitted data packet, wherein:
    said at least two second time intervals are shifted in time by more than the length of a first time interval.

2. The transmitter of claim 1, wherein said transmission unit operates according to a hybrid ARQ scheme to retransmit the same or different code blocks from a data packet to be combined at the receiver.

3. The transmitter of claim 1, wherein said transmission unit transmits the encoded data packet downlink to the receiver, and said receiving unit receives the acknowledgment message uplink from the receiver.

4. The transmitter of claim 1, wherein said transmission unit transmits the encoded data packet uplink to the receiver, and said receiving unit receives the acknowledgment message downlink from the receiver.

5. The transmitter of claim 1, wherein the receiving unit receives the acknowledgment message on a Dedicated Physical Control Channel of a Universal Mobile Telecommunications System (UMTS).

6. The transmitter of claim 5, wherein said transmission unit operates according to the High Speed Downlink Packet Access (HSDPA) scheme.

7. The transmitter of claim 1, wherein said transmission unit transmits the encoded data packet to the receiver on a shared packet channel where different users of the communication system are time-multiplexed.

8. The transmitter of claim 1, wherein the length of the first time intervals is larger than the length of the second time intervals.

9. The transmitter of claim 8, wherein the length of the first time interval is an integer multiple of the length of the second time interval.

10. The transmitter of claim 9, wherein the transmission unit transmits data packets in first intervals of three time slots and receives acknowledgment messages in second time intervals of one time slot.

11. The transmitter of claim 1, wherein the control section changes the length of the first and/or second time intervals during operation of the transmitter.

12. The transmitter of claim 1, wherein the receiving unit receives simultaneously in one of the second time intervals, acknowledgment messages that relate to different data packets and that can be distinguished by the transmitter.

13. The transmitter of claim 12, wherein the control unit distinguishes the acknowledgment messages relating to different data packets, based on channelization codes or signatures.

14. An Automatic Repeat Request (ARQ) method of operating a transmitter for transmitting data on a radio channel in a communications system to a receiver, the method comprising the steps of:
    encoding the data and transmitting an encoded data packet;
    receiving a positive or negative acknowledgment message from the receiver indicating that the receiver was or was not able to decode the data packet; and
    if a negative acknowledgment message was received, performing a retransmission;
    wherein data packets are transmitted in first predetermined time intervals and acknowledgment messages are received in second predetermined time intervals after the first time intervals;

monitoring at least two second time intervals for possible reception of one acknowledgment message in response to each transmitted data packet, wherein:

said at least two second time intervals are shifted in time by more than the length of a first time interval.

15. An Automatic Repeat Request (ARQ) receiver for receiving encoded data packets on a radio channel in a communications system from a transmitter, the receiver comprising:

a receiving unit for receiving an encoded data packet and decoding said data packet; and a transmission unit for transmitting a positive or negative acknowledgment message to the transmitter indicating that the data packet could or could not be decoded;

wherein the receiving unit receives the encoded data packet in first predetermined time intervals and transmits acknowledgment messages in second predetermined time intervals after the first time intervals; and the receiver further comprising a selection section for selecting, for each received encoded data packet, one of at least two second time intervals for transmission of the acknowledgment message, wherein:

said selection section selects, from said at least two second time intervals, a later time interval when a high modulation coding scheme level has been transmitted.

16. An Automatic Repeat Request (ARQ) receiver for receiving encoded data packets on a radio channel in a communications system from a transmitter, the receiver comprising:

a receiving unit for receiving an encoded data packet and decoding said data packet; and a transmission unit for transmitting a positive or negative acknowledgment message to the transmitter indicating that the data packet could or could not be decoded;

wherein the receiving unit receives the encoded data packet in first predetermined time intervals and transmits acknowledgment messages in second predetermined time intervals after the first time intervals; and the receiver further comprising a selection section for selecting, for each received encoded data packet, one of at least two second time intervals for transmission of the acknowledgment message, wherein:

said selection section selects, from said at least two second time intervals, a time interval dependent on the physical resources that have been allocated, such as frequencies, codes and time slots.

17. The receiver of claim 15, wherein said selection section selects, from said at least two second time intervals, a time interval and one of at least two acknowledgment messages.

18. The receiver of claim 17, wherein said selection section performs the selection of different acknowledgment messages based on channelization codes or signatures.

19. The receiver of claim 16, wherein said selection section selects, from said at least two second time intervals, a time interval and one of at least two acknowledgment messages.

20. The receiver of claim 19, wherein said selection section performs the selection of different acknowledgment messages based on channelization codes or signatures.

* * * * *